United States Patent [19]

Zweegers

[11] Patent Number: 4,776,519
[45] Date of Patent: Oct. 11, 1988

[54] DEVICE FOR SPREADING GRANULAR AND/OR POWDERY MATERIAL

[75] Inventor: Petrus W. Zweegers, Geldrop, Netherlands

[73] Assignee: Z.P.M. International B.V., Geldrop, Netherlands

[21] Appl. No.: 43,952

[22] Filed: Apr. 29, 1987

[30] Foreign Application Priority Data

May 6, 1986 [NL] Netherlands ................... 8601148

[51] Int. Cl.⁴ .......................................... A01C 17/00
[52] U.S. Cl. .................................. 239/665; 239/670; 239/683; 239/687
[58] Field of Search ............... 239/661, 665, 666, 670, 239/681, 683, 687, 97

[56] References Cited

U.S. PATENT DOCUMENTS

| | | | |
|---|---|---|---|
| 2,489,171 | 11/1949 | Balduf | 239/665 |
| 2,519,243 | 8/1950 | Gjertson | 239/661 |
| 2,587,678 | 3/1952 | Aasland et al. | 239/666 |
| 2,723,860 | 11/1955 | Weeks | 239/661 |
| 3,129,846 | 4/1964 | Van Der Lely et al. | 239/670 |
| 3,157,403 | 11/1964 | Van Der Lely et al. | 239/665 |
| 3,401,889 | 9/1968 | Parker | 239/683 |
| 3,618,824 | 11/1971 | Seymour | 239/683 |
| 3,899,138 | 8/1975 | Van Der Lely et al. | 239/661 |
| 3,964,681 | 6/1976 | Herd | 239/661 |
| 4,183,468 | 1/1980 | Van Der Lely et al. | 239/665 |
| 4,609,153 | 9/1986 | Van Der Lely | 239/665 |

FOREIGN PATENT DOCUMENTS 8502598 1/1986 Netherlands .................. 239/661

*Primary Examiner*—Andres Kashnikow
*Assistant Examiner*—Michael J. Forman
*Attorney, Agent, or Firm*—Edmund M. Jaskiewicz

[57] ABSTRACT

Device for spreading granular and/or powdery material provided with a frame and a drivable spreader supported by the frame and during operation rotatable about an upwardly extending axis of rotation and a metering structure arranged above the spreader, the metering structure being provided with at least one discharge opening via which the material to be spread is supplied to the spreader during operation, and the metering structure can be put into continuously reciprocating movement during operation relative to the frame about an upwardly extending pivot axis.

11 Claims, 3 Drawing Sheets

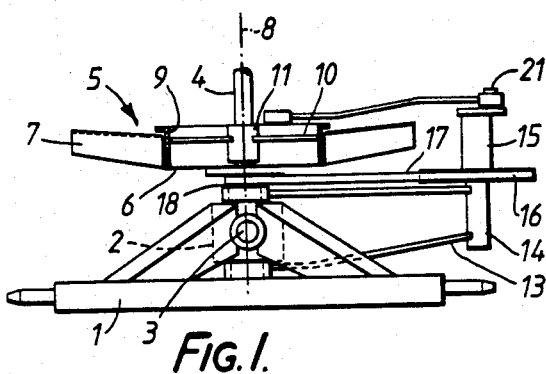
FIG. I.
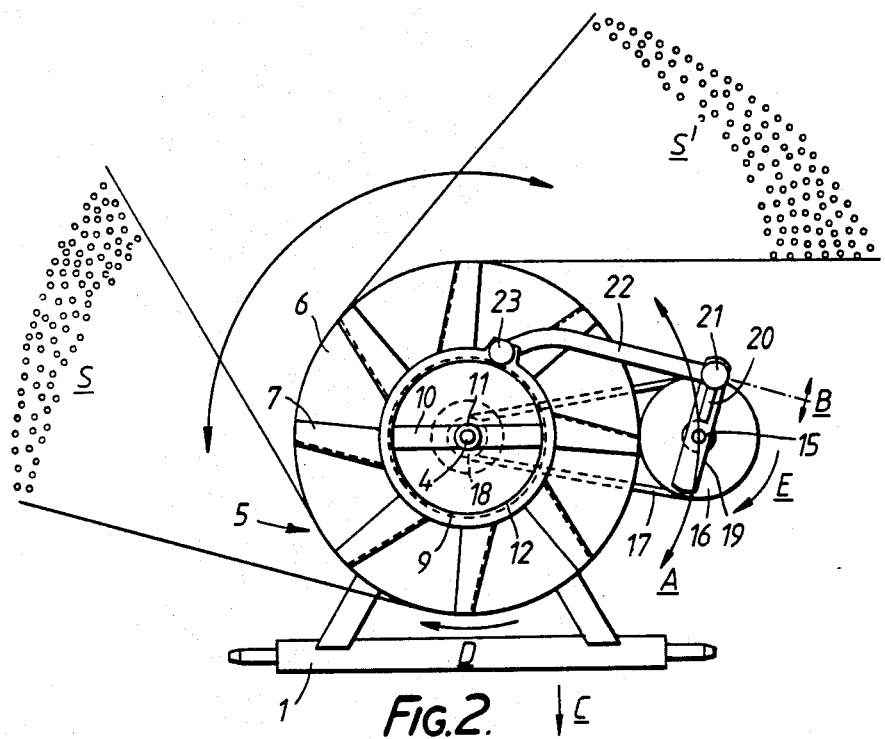
FIG. 2.

DEVICE FOR SPREADING GRANULAR AND/OR POWDERY MATERIAL

The invention relates to a device for spreading granular and/or powdery material comprising a frame and a drivable spreading means supported by the frame and during operation rotatable about an upwardly extending axis of rotation and a metering means arranged above said spreading means, said metering means being provided with at least one discharge opening via which the material to be spread is supplied to the spreading means during operation.

With known devices of the above-mentioned kind, which are used e.g. for spreading fertilizer, the metering means is provided with one or more discharge openings extending about the axis of rotation of the spreading means over a relatively large angle in order to effect that the material is spread over a wide strip of land during the movement of the device during operation. In practice it has become apparent thereby that in this manner no accurate spreading pattern, i.e. no even distribution of the material over the entire width of the strip strewn over can be achieved.

In order to meet this disadvantage use is being made of spreaders with a spout swivelling to and fro during operation. A disadvantage of these devices, however, is that the material can only be flung away along a comparatively small distance by means of the spout.

According to the invention means are now provided by means of which the metering means can be put into a reciprocating movement relative to the frame about an upwardly extending pivot axis during operation.

By using the construction according to the invention it can be achieved that the material is supplied to the spreading means through a comparatively small discharge opening, which influences the spreading accuracy advantageously, whilst because the discharge opening moves to and fro during operation it is still possible to strew over a wide strip of land by means of the rotating spreading means.

The construction according to the invention can also be used particularly successfully with devices whereby during operation the spreading means rotates about an axis of rotation including an angle with the vertical. Such devices are used e.g. for spreading fertilizer over lands with standing crops, in order to be able to spread the fertilizer over the tops of the crops.

If with such a device the material leaves the rotating spreading means over a comparatively large circumferential angle there will be a great variation in the magnitude of the angle at which the material moves upwards relative to the horizontal when leaving the spreading means and there will also be a danger that the material which is flung away is at least partly flung against the crops instead of over the tops of the crops. It will be apparent that this is most disadvantageous for obtaining an even spreading.

According to the invention now the axis of rotation including an angle with the vertical, about which axis the spreading means is rotatable, can be put into a reciprocating movement together with the metering means.

Because of this it is effected that material supplied to the spreading means is flung from the spreading means at a comparatively small circumferential angle, as a result of which all the material flung away will be spread upwards and over the tops of the crops at substantially the same angle relative to the horizontal which is conducive to obtaining an even spreading, whilst the fling-off point is moved to and fro about the axis of rotation during operation, so that a large working width can still be obtained.

The invention will be more fully explained hereinafter with reference to a few embodiments of the construction according to the invention illustrated in the accompanying figures.

FIG. 1 diagrammatically illustrates a part of a device for spreading granular and/or powdery material, in particular fertilizer.

FIG. 2 is a top view of FIG. 1.

Figure 5:
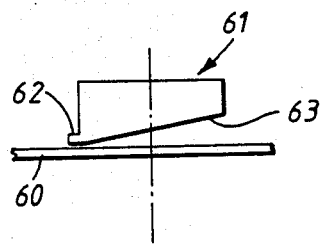

FIG. 5 diagrammatically illustrates a further possible embodiment of a metering means.

FIGS. 1 and 2 illustrate a part of a device for spreading granular and/or powdery material, in particular a fertilizer spreader, comprising a frame 1 which can be coupled to a tractor or the like.

The frame 1 supports a gearbox 2, in which a shaft 3 extending horizontally in front of the gearbox is journalled. The shaft 3 can be coupled to the power take-off of a tractor or the like by means of an intermediate shaft in a manner known by itself.

A shaft 4 accommodated with one end in the gearbox 2 and being at least substantially vertical during normal operation supports a spreading means 5, which may be constructed in a usual manner of a disc 6 and blades 7 fixed to the disc. The construction is thereby such that during operation the spreading means can be rotated about an axis of rotation 8 formed by the centre line of the shaft 4 and being at least substantially vertical.

Resting on the spreading means 5 is a ring 9 concentrically surrounding the shaft 4. The ring 9 is fixed, by means of a few spokes 10, to a bush 11 being freely rotatable about the shaft 4. In the ring 10 there is provided a hole 12 forming a discharge opening.

Above the ring 9 there will be arranged, in a usual manner, a hopper or container supported by the frame 1, containing the material to be spread. Said material can flow from said hopper or container into the interior of the ring 9 and from the interior of the ring 9 operating as a metering means, through the discharge opening 12, on the disc 6. Furthermore a closing means, not shown, may be provided by means of which the size of the discharge opening can be varied and possibly closed altogether.

The construction of a fertilizer spreader described hereinabove is generally known and usual.

The device is furthermore provided with an arm 13 extending radially outwardly from the shaft 4, said arm being pivotable about the shaft 4 as indicated by means of the double arrow A (FIG. 2) and being fixable in chosen positions.

To the end of the shaft 4 remote from the arm 13 there is fixed a bush 14 in which a vertical shaft 15 protruding above the bush 14 is journalled freely rotatably. To the shaft 15 there is fixed a pulley 16 which is coupled, by means of a belt 17, to a pulley 18 fixed to the shaft 4.

To the upper end of the shaft 15 there is fixed an arm 19 extending perpendicularly to said shaft 15. In the arm 19 there is provided a slotted hole 20. Accommodated in the slotted hole 20 is the end of a pivot pin 21 extending parallel to the shaft 15, said pin being movable, as indicated by means of the double arrow B, in the slotted hole 20 in a direction towards the shaft 15 and in a direction away from the shaft 15 and being flexible in the slotted hole 20 in any desired position. The end of the connecting rod 22 remote from the pivot pin 21 is coupled to the ring 9 forming a metering means by means of a pivot pin 23 extending parallel to said pivot pin.

During operation the device will be moved in a direction according to arrow C, whilst the spreading means 5 will thereby be rotated in the direction according to arrow D, which will also cause rotation of the pulley 16 in the direction according to arrow E. It will be apparent that by transferring said rotation in the direction according to arrow E of the pulley 16 to the ring 9 via the crank-connecting rod mechanism formed by the arm 19 and the connecting rod 22 said ring 9 will be put into a reciprocating movement about the axis of rotation 8. Consequently also the position of the discharge opening 12 and therewith the position where the material to be spread is delivered to the spreading means 5 will move reciprocatingly about the axis of rotation 8.

In a first extreme position of the reciprocating movement of the discharge opening 12 the material is e.g. delivered to the spreading means in such a manner that said material is spread over the sector S illustrated in FIG. 2, whilst in the other extreme position of the discharge opening the material delivered will be spread over the sector S' illustrated in FIG. 2. However, because the discharge opening 12 moves to and fro between said two extreme positions also the area located between the two sectors S and S' will be strewn over with material. As a result of the comparatively small angle over which a sector S extends, however, it will be possible to have very even spreading in such a sector and therewith also over the entire area covered during operation.

Furthermore it will be apparent that by adjusting the arm 13 about the axis of rotation 8 the position of the strip of land strewn over with material during operation relative to the longitudinal axis of the device can also be altered, so that in using the construction according to the invention it will also be possible to spread both behind and beside the device.

By adjusting the pivot point 21 along the arm 19 it will be possible to regulate the length of the stroke of ring 9 about axis of rotation 8 and therewith the entire spreading width.

Figure 3:
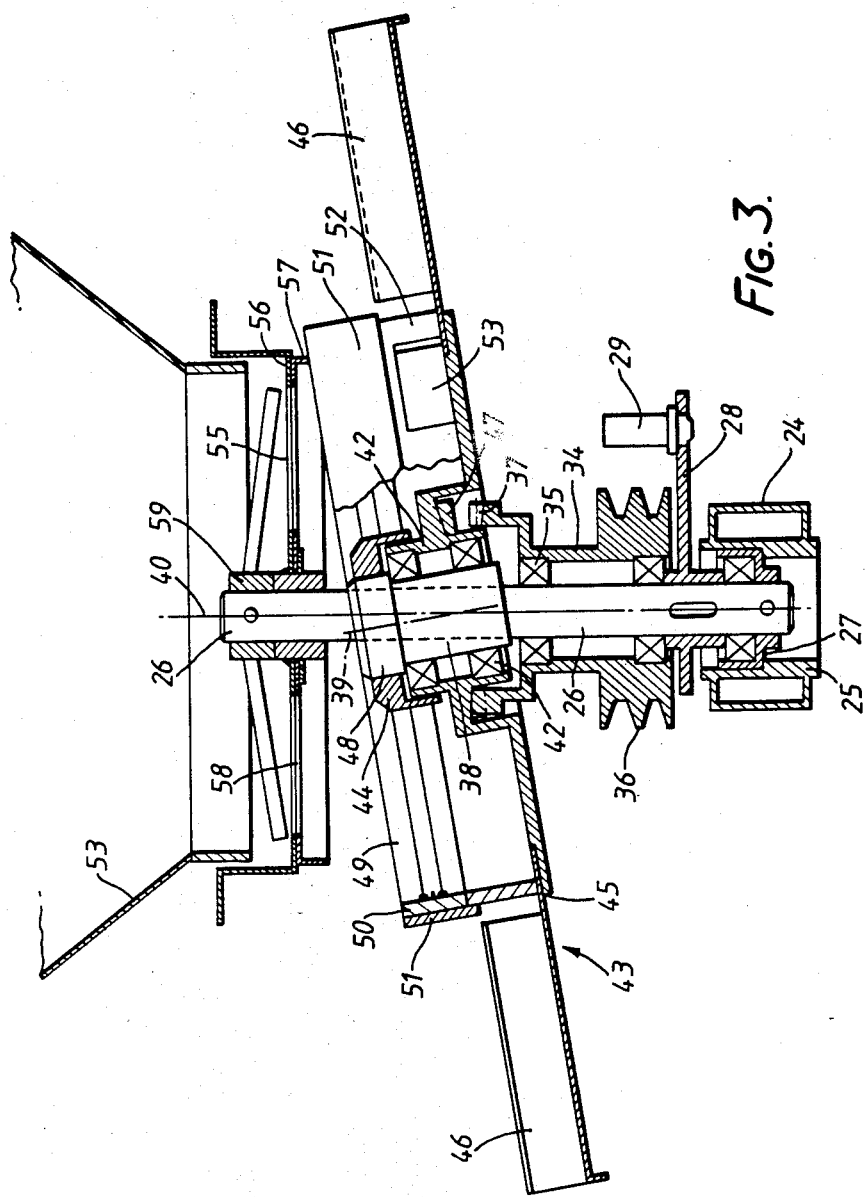
FIG. 3 is a diagrammatic section of a part of a further embodiment of a device according to the invention.
Figure 4:
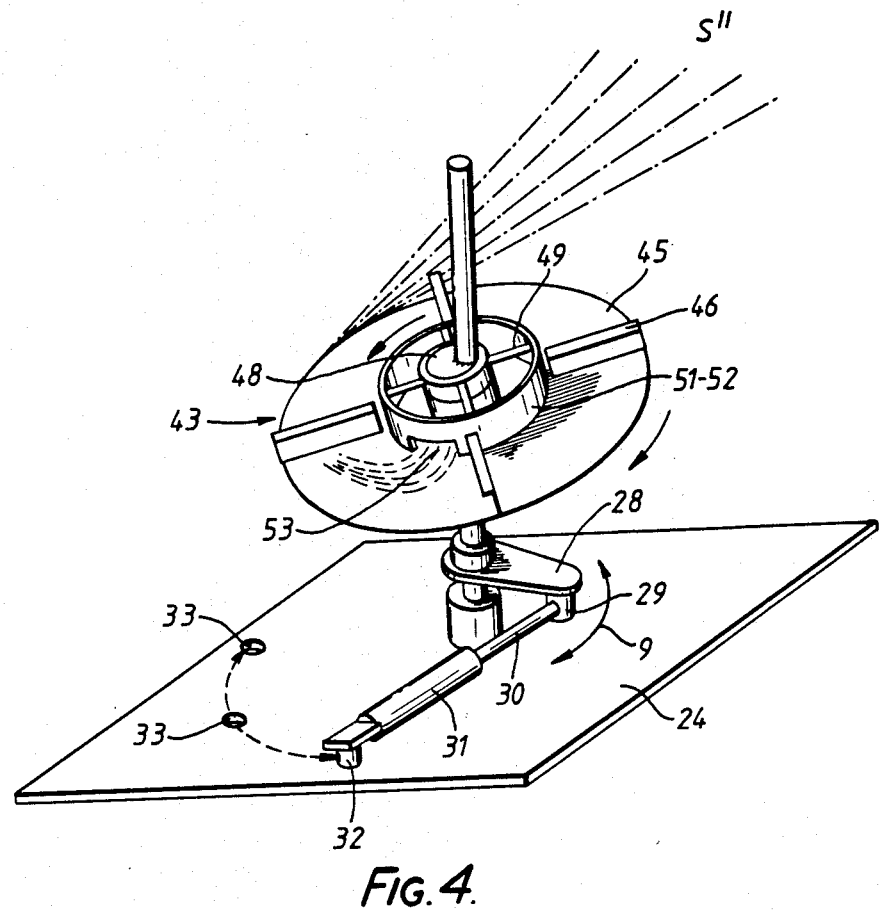
FIG. 4 is a perspective, diagrammatic view of some of the parts of the device illustrated in FIG. 3.

FIG. 3 and 4 diagrammatically illustrate an embodiment of a spreader, in particular a fertilizer spreader, whereby during operation the spreading means is rotatable about an axis of rotation including an angle with the vertical.

As already explained hereinabove such a construction is used e.g. to make it possible to spread the fertilizer over high standing crops. If the fertilizer is flung from the spreading disc over a comparatively large circumferential angle for obtaining a sufficiently large spreading area, there will be the disadvantage that e.g. near the centre of said angle over which the material is flung the material will be flung steeper upwards than near the ends of said angle over which the material is flung. It will be apparent that this has a very disadvantageous influence on an even spreading of the material. As will be more fully explained hereinafter this can be avoided by using the construction according to the invention.

As is illustrated in FIG. 3 the device comprises a frame 24, accommodating a bush 25 which supports a lower end of a vertical shaft 26 by means of a bearing 27. To the end of the shaft 26 protruding above the bush there is fixed an arm 28 extending perpendicularly to the shaft 26. To the free end of the arm 28 there is fixed a pin 29. By means of the pin 29 there is pivotally connected with the arm 28 the piston rod of a setting cylinder 31. The end of the piston rod 30 remote from the setting cylinder 31 is connected to the frame 24 diagrammatically illustrated in FIG. 4 by means of a pin 32.

For connecting the pin 32 to the frame 24 several holes 33 are provided in the frame, said holes being located on a circular arc extending concentrically about the centre line of the shaft 26.

Above the arm 28 the shaft 26 is surrounded by a bush 34, which is supported freely rotatably about the shaft 26 by means of bearings 35. The bush 34 is provided with a pulley 36 at its lower end and with a gear wheel 37 at its upper end.

The part of the shaft 26 protruding above the bush 34 is provided with a thickening 38 having a circular section whose centre line 39 includes an angle with the centre line 40 of the shaft 26, being at least substantially vertical during normal operation. On the shaft shaped thickening 38 a boss 42 of a spreading means 43 is rotatable by means of bearings 41. Also in this embodiment the spreading means 43 comprises a disc shaped means 45 and throwing scoops 46 fixed to said disc shaped means. The spreading means 43 is furthermore provided with a gear wheel 47 extending concentrically about the centre line 39 forming an axis of rotation for the spreading means, said gear wheel engaging the gear wheel 37 in the manner illustrated in FIG. 3.

To a thickened upper end 48 of the shaft part 38 there is fixed a ring 44, which is connected, by means of a few spokes 49, to a supporting ring 50 extending concentrically about the centre line 39. A bearing ring 51 is rotatable about said supporting ring 50 and fixable in a desired position by means of locking means not shown. To the bottom end of the bearing ring 51 there is fixed a ring 52 operating as a metering means and located under the supporting ring 50 and in the extension of said supporting ring. In the ring 52 there is provided a hole 53 acting as a discharge opening. There may be provided means, not shown, for regulating the size of the hole and/or closing the hole.

Furthermore the device is provided with a reservoir 54 supported by the frame, under whose open lower end there is arranged a bottom plate 56 provided with openings 55. The openings 55 in said bottom plate can be closed by means of a movable closing plate 57 located under the bottom plate, said closing plate also being provided with openings 58.

To the upper end of the shaft 26 located near the lower end of the reservoir 54 there is furthermore fixed a stirring means 59.

For rotating the spreading means 43 about its axis of rotation 39 the bush 34 with the gear wheel 37 connected thereto is rotated via a belt transmission, not shown, driven in a usual manner from e.g. the power take-off of a tractor supporting the device, the pulley 36 forming part of said belt transmission.

During operation the fertilizer can flow in a usual manner from the reservoir through the openings 55 and 58 into the interior of the ring 52 acting as a metering means and be supplied from said ring through the discharge opening 53 to the scoops 46 of the spreading disc, as is usual with fertilizer spreaders and the like.

According to the invention, however, the shaft 26 can now be pivoted to and fro by means of the setting cylinder 31 during operation, as is indicated by means of the arrow G in FIG. 4. It will be apparent that thereby the shaft part 38 and with it also the spreading means 43 and the metering means 52 are pivoted about the centre line 40 of the shaft 26. During said pivoting of the metering means 52 and the spreading means 43 the position of the discharge opening relative to e.g. the highest point of the disc shaped means of the spreading means remains unchanged, therefore.

By using the construction according to the invention it is possible to achieve, therefore, that on the one hand the material is flung from the spreading means of the device over a comparatively small circumferential angle, so that said material covers a comparatively small sector S" as indicated in FIG. 4, which advantageously influences an even spreading, as all the material moves obliquely upwardly at substantially the same angle, whilst on the other hand said sector S" is pivoted to and fro about the centre line 40 of the shaft 26 during operation, so that it is still possible to cover a wide strip of land.

By choosing the connecting point 33 at which the setting cylinder 31 is coupled to the frame 24 it is possible to choose the position of the strip of land strewn over during operation, e.g. beside or behind the device.

Preferably also adjusting means, not shown, are provided by means of which the ring 52 can be adjusted about the axis of rotation 39 relative to the spreading means 43 in order to influence therewith the location where the material is delivered through the discharge opening to the spreading means 43. Because of that it will be possible to influence the direction in which the material is flung from the spreading means and that gradually increasing from a substantially horizontal direction to a direction aimed strongly obliquely upwardly.

Means may also be provided for regulating the stroke of the setting cylinder 31 for influencing the working width of the device.

Of course many variants of the embodiments described hereinabove will be possible within the spirit and scope of the invention. Besides e.g. the crank-connecting rod mechanism illustrated in FIGS. 1 and 2 or the setting cylinder for effecting a reciprocating movent of the metering means illustrated in FIG. 4 also other driving mechanisms, e.g. eccentric mechanisms or the like may be used. Driving may thereby take place mechanically, hydraulically or electrically. Also many variants of the construction of the metering means will be possible.

Thus FIG. 5 diagrammatically illustrates a metering means 61 above a spreading means 60. Said metering means 61 is formed by a hopper, open at its upper side and having a bottom 63 extending obliquely downwardly in the direction of a spout 62 at its bottom side. Here the bottom 63 carries the material, therefore, and said material can only be discharged via the spout 62.

I claim:

1. A device for spreading granular and powdery material comprising a frame, means on said frame for defining an upwardly extending axis of rotation, a rotatable spreading means on said frame and during operation rotatable around said axis of rotation, means disposed above said spreading means and having at least one discharge opening through which material to be spread is supplied for metering the supply of the material to said spreading means, and means for actuating said metering means in a continuously reciprocating movement around said axis of rotation so as to selectively spread the material at a comparatively small circumferential angle so as to obtain a uniform distribution of the spread material.

2. A device as claimed in claim 1 wherein said axis of rotation defining means includes means for defining an axis of rotation at an angle with respect to the vertical axis about which said spreading means is rotatable, and means for actuating said axis of rotation defining means in a reciprocating movement together with said metering means.

3. A device as claimed in claim 2 wherein said axis of rotation defining means comprises a vertical shaft, said vertical shaft having a portion thereon defining said axis of rotation at an angle with respect to the vertical, said vertical shaft being connected to said means for actuating said axis of rotation defining means.

4. A device as claimed in claim 3 wherein said vertical shaft and the means for actuating the metering means are rotatable about the center line of the vertical shaft and are adjustable into a plurality of positions.

5. A device as claimed in claim 1 and further comprising means for adjusting selectively said metering means about its pivot axis relative to said spreading means into a plurality of adjusted positions, said means for actuating said metering means in continuously reciprocating movements being operable in each of said adjusted positions.

6. A device as claimed in claim 1 wherein the length of a stroke of the reciprocating movement is adjustable.

7. A device as claimed in claim 1 wherein said means for actuating said metering means in a continuously reciprocating movement comprises a crank-connected rod mechanism.

8. A device as claimed in claim 7 wherein a connecting point of the connecting rod is adjustable with respect to the axis of rotation of the crank.

9. A device as claimed in claim 8 and further comprising an arm supporting the crank of the crank-connecting rod mechanism, said arm being rotatable about the pivot axis of the metering means and having a plurality of adjustable positions.

10. A device as claimed in claim 1 and comprising a setting cylinder connected to said means for actuating said metering means to reciprocate said metering means.

11. A device as claimed in claim 10 wherein said setting cylinder has an adjustable stroke.

* * * * *